United States Patent
Tam et al.

(10) Patent No.: US 9,964,768 B2
(45) Date of Patent: May 8, 2018

(54) HEAD MOUNTED DISPLAY USING SPATIAL LIGHT MODULATOR TO GENERATE A HOLOGRAPHIC IMAGE

(71) Applicant: Sharp Kabushiki Kaisha, Osaka (JP)

(72) Inventors: Ka Ho Tam, Oxford (GB); David James Montgomery, Bampton (GB)

(73) Assignee: Sharp Kabushiki Kaisha, Osaka (JP)

( * ) Notice: Subject to any disclaimer, the term of this patent is extended or adjusted under 35 U.S.C. 154(b) by 63 days.

(21) Appl. No.: 15/060,999

(22) Filed: Mar. 4, 2016

(65) Prior Publication Data
US 2017/0255013 A1    Sep. 7, 2017

(51) Int. Cl.
G03H 1/22    (2006.01)
G02B 27/01    (2006.01)
(Continued)

(52) U.S. Cl.
CPC ..... *G02B 27/0172* (2013.01); *G02B 27/0176* (2013.01); *G03H 1/2286* (2013.01);
(Continued)

(58) Field of Classification Search
CPC ................. G03H 1/2645; G03H 1/265; G03H 2001/0489; G03H 2001/2655;
(Continued)

(56) References Cited

U.S. PATENT DOCUMENTS

| 8,540,373 B2 | 9/2013 | Sakakibara et al. |
| 2014/0036361 A1* | 2/2014 | Woodgate ............... G02F 1/011 359/466 |

(Continued)

FOREIGN PATENT DOCUMENTS

| CN | 103837986 A | 6/2014 |
| JP | 2013148609 A | 1/2013 |

(Continued)

OTHER PUBLICATIONS

Reichelt Stephan et al."Holographic 3-D Displays—Electro-holography within the Grasp of Commercialization", Advances in Lasers and Electro Optics [online], Apr. 1, 2010 [retrieved on May 15, 2017], pp. 683-710

(Continued)

*Primary Examiner* — Jennifer D. Carruth
(74) *Attorney, Agent, or Firm* — Renner, Otto, Boisselle & Sklar, LLP

(57) ABSTRACT

A head mounted display device includes a light source that emits a high coherence light beam, a beam expansion/diverging element that expands the light beam emitted by the light source, and a beam converging element that converges the expanded light beam into a viewing zone. The light beam from the beam converging element is incident onto a spatial light modulator (SLM), and the SLM is configured to add a phase pattern and/or an amplitude pattern to the light beam to generate a virtual image that is visible to a user wearing the head mounted display device. The light converging element creates a beam or scanning beam axis that converges towards the eye, which enables a large field of view for a virtual or holographic image to be displayed.

20 Claims, 15 Drawing Sheets

(51) Int. Cl.
  *H04B 10/50* (2013.01)
  *H04B 10/516* (2013.01)
  *H04N 9/31* (2006.01)
(52) U.S. Cl.
  CPC ......... *G03H 1/2294* (2013.01); *H04B 10/502* (2013.01); *H04B 10/516* (2013.01); *H04N 9/3161* (2013.01); *G02B 2027/013* (2013.01); *G02B 2027/0152* (2013.01); *G02B 2027/0174* (2013.01); *G03H 2001/2292* (2013.01); *G03H 2225/31* (2013.01); *G03H 2225/32* (2013.01); *G03H 2225/52* (2013.01)
(58) Field of Classification Search
  CPC ..... G03H 2001/266; G03H 2001/2665; G03H 2001/267; G03H 2001/2675; G03H 2210/10; G03H 2210/20; G03H 2210/30; G03H 2225/33; G03H 2225/34; G03H 1/0005; G03H 2001/2292; G02B 2027/01; G02B 2027/0105; G02B 2027/0107; G02B 2027/0109; G02B 2027/0129; G02B 2027/013; G02B 2027/0134; G02B 27/01; G02B 27/0101; G02B 27/0172; G02B 27/0149; G02B 27/0176; G02B 27/00
  See application file for complete search history.

(56) References Cited

U.S. PATENT DOCUMENTS

2014/0043320 A1\* 2/2014 Tosaya ............... G02B 27/0172
  345/419
2015/0378306 A1\* 12/2015 Gurevich ............. G03H 1/0005
  359/12

FOREIGN PATENT DOCUMENTS

| JP | 5237267 B2 | 7/2013 |
| WO | WO 9409472 A1 | 4/1994 |
| WO | WO 97/35223 A1 | 9/1997 |
| WO | WO 2012062681 A1 | 5/2012 |
| WO | WO 2014155288 A2 | 10/2014 |
| WO | WO 2015132775 A1 | 9/2015 |
| WO | WO 2016/105281 A1 | 6/2016 |

OTHER PUBLICATIONS

IDW 14 PRJ4-1, Masafumi Ide, et al., "*Laser Light Field Display Based on a Retinal Scanning Array*", IDW 2014.

\* cited by examiner

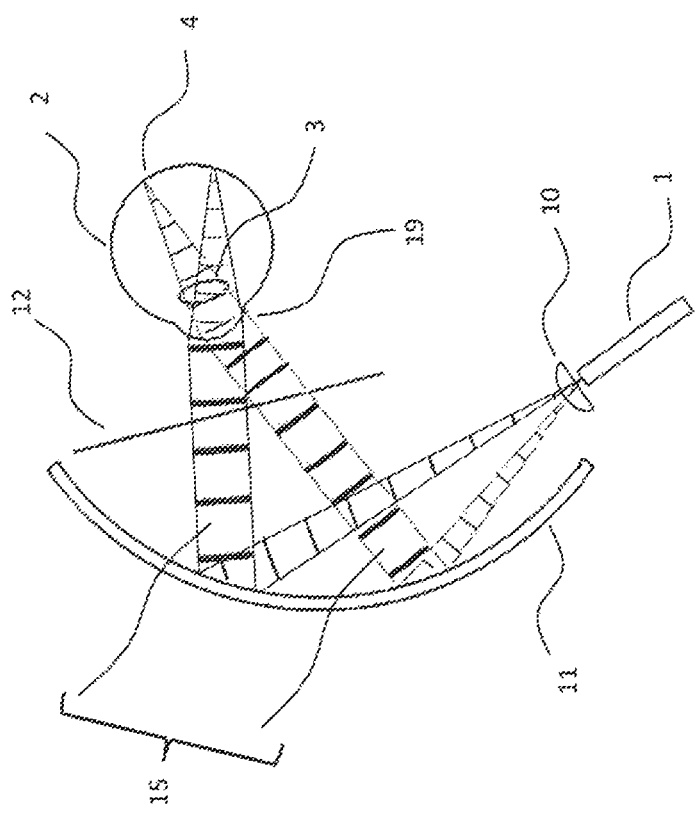

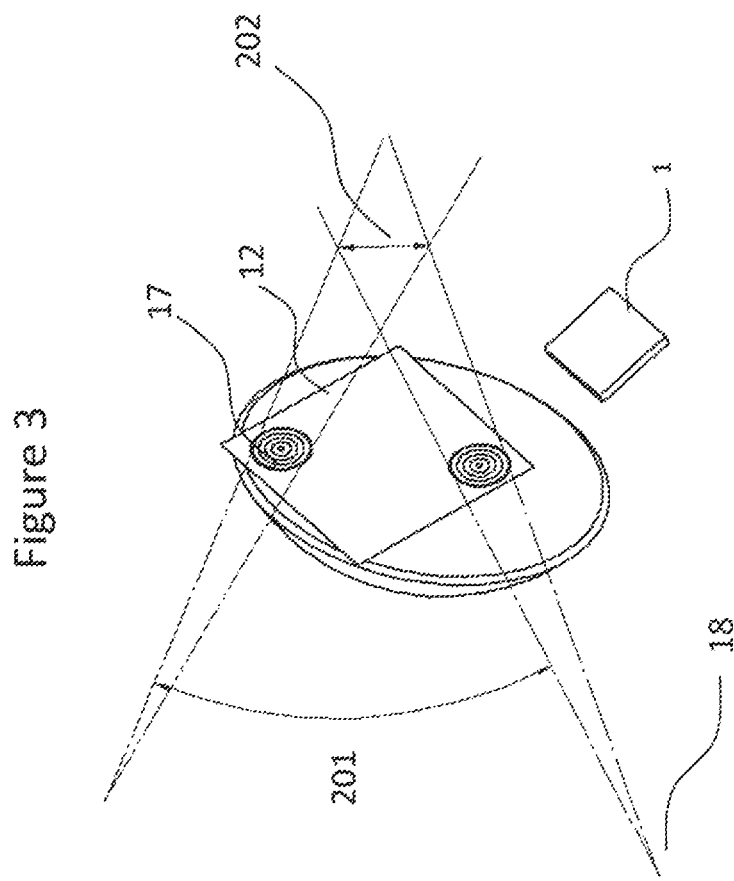

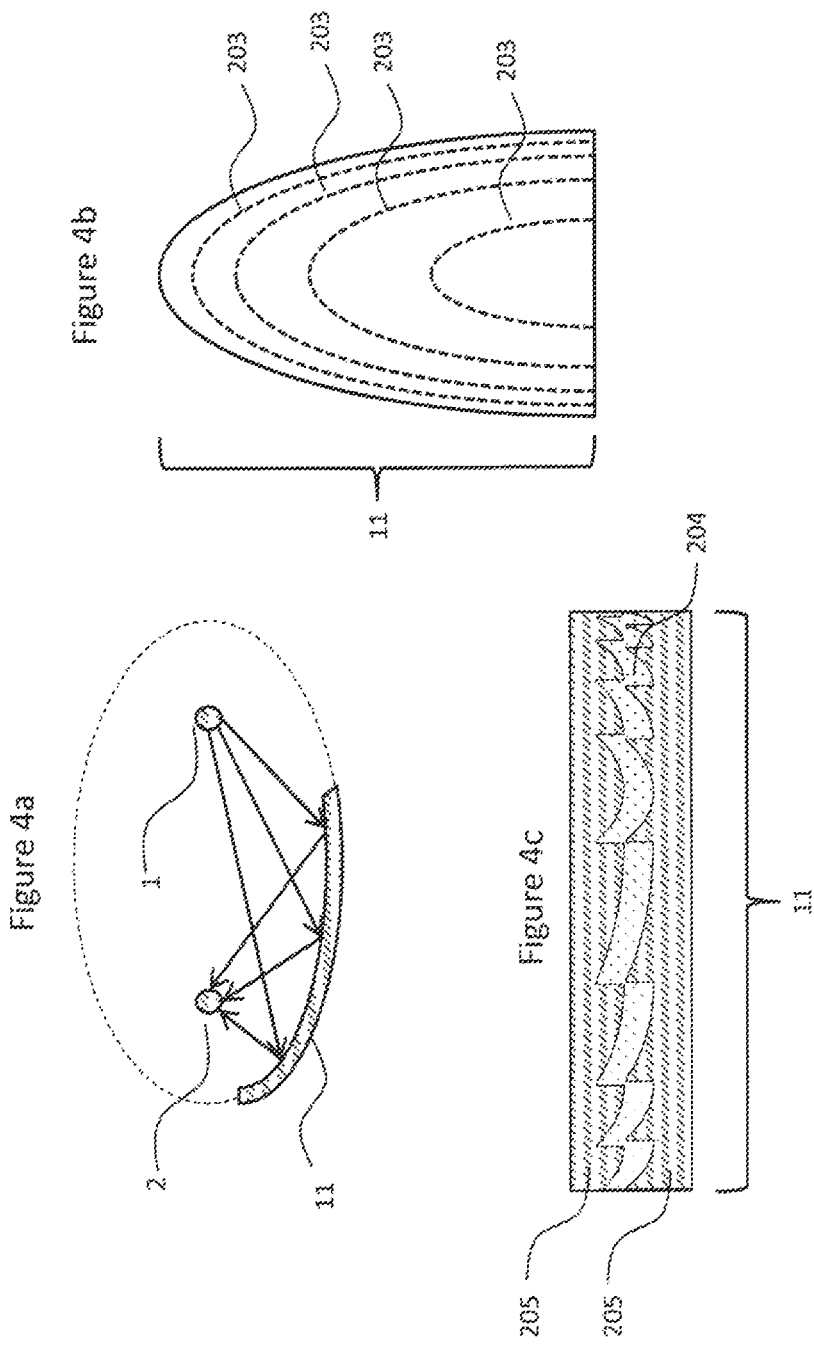

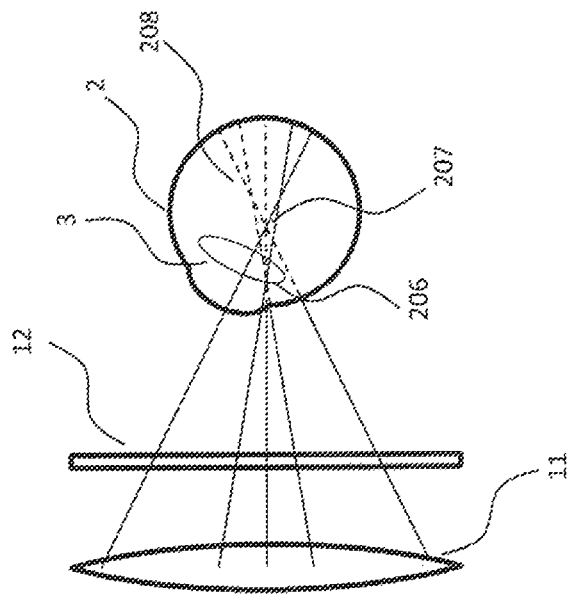
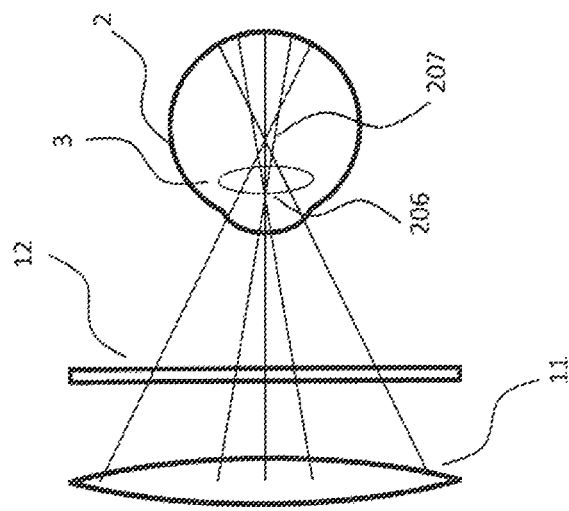

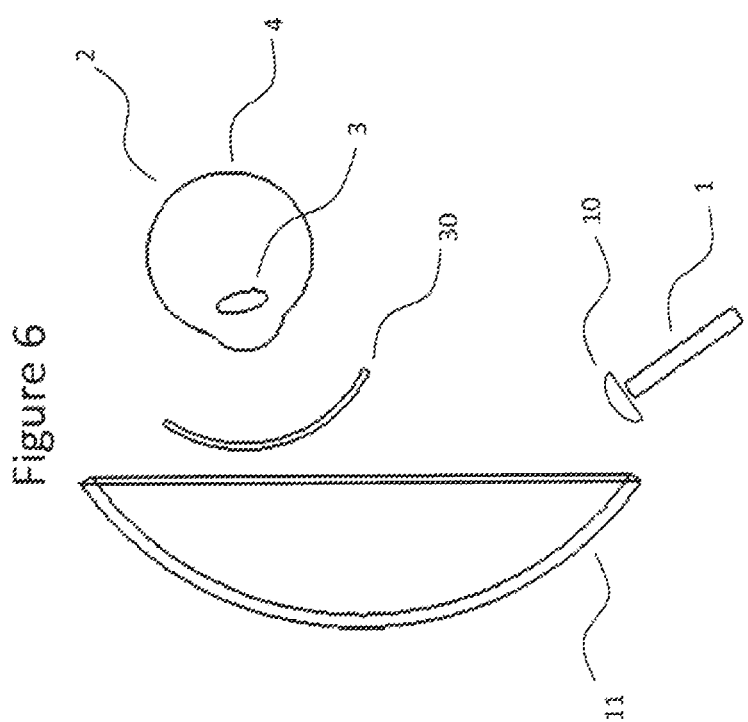

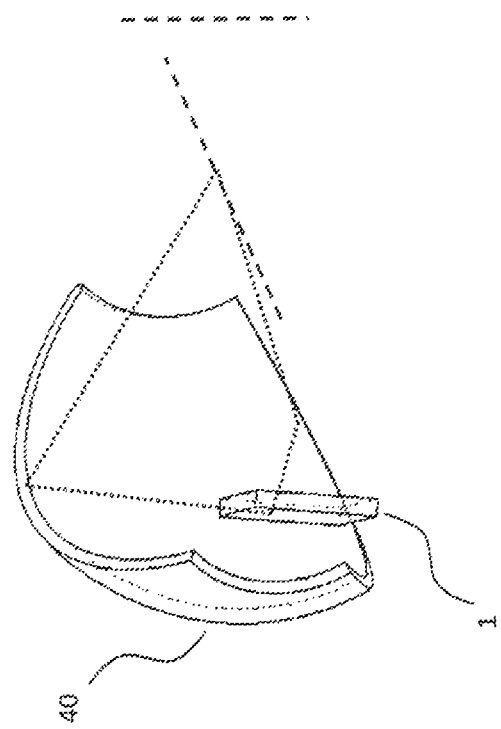
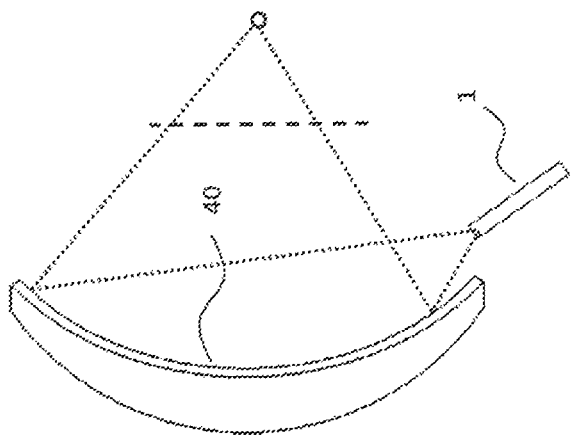

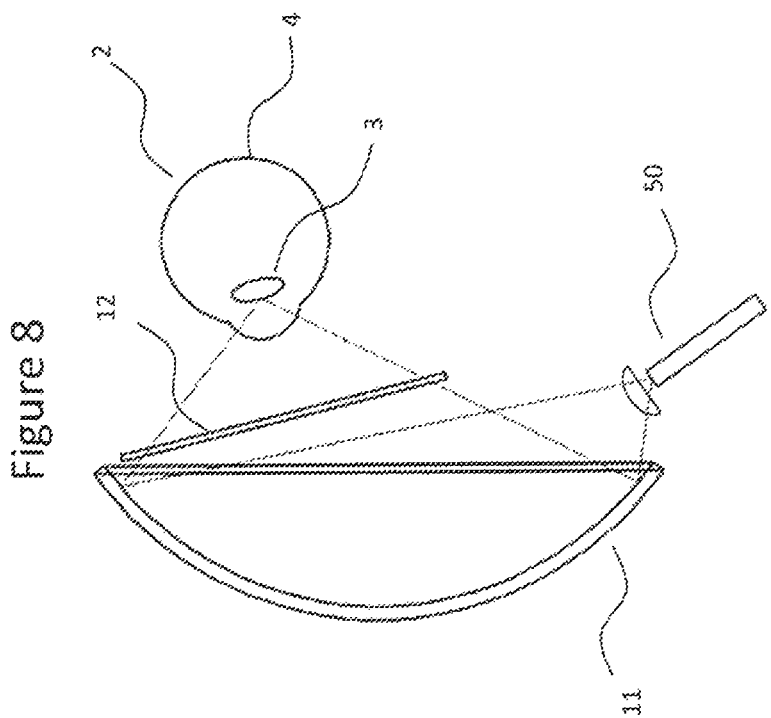

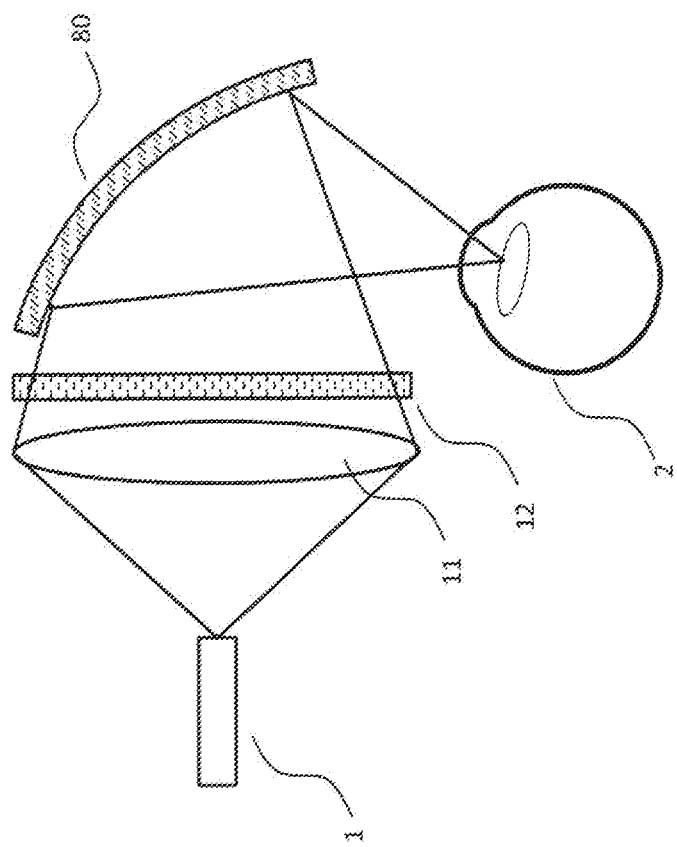

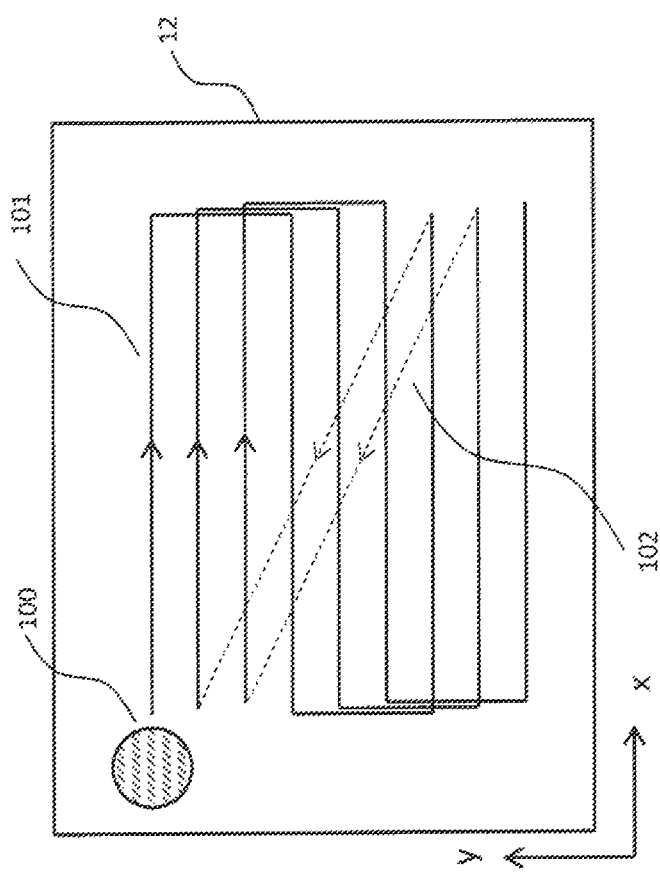

HEAD MOUNTED DISPLAY USING SPATIAL LIGHT MODULATOR TO GENERATE A HOLOGRAPHIC IMAGE

TECHNICAL FIELD

The invention has application within the field of wearable displays. It is used for achieving a light weight design in head mounted displays.

BACKGROUND ART

Head-Mounted-Displays (HMD) is a type of device with increasing popularity within the consumer electronics industry. HMDs, along with similar devices such as helmet-mounted displays, smart glasses, and virtual reality headsets, allow users to wear a display device such that the hardware remains fixed to their heads regardless of the person's movement.

When combined with environmental sensors such as cameras, accelerometers, gyroscopes, compasses, and light meters, HMDs can provide users with experiences in virtual reality and augmented reality. Virtual reality allows a user to be completely submerged into a virtual world where everything the user sees comes from the display device. On the other hand, devices that provide augmented reality allow users to optically see the environment. Images generated by the display device are added to the scene and may blend in with the environment.

One of the primary elements of HMDs is a display module mounted onto the head. However, since the unaided human eye cannot accommodate for images closer than a certain distance from the eye, eye piece lenses are required to re-image the display module such that the display appears to be at a comfortable viewing distance from the user. Such optical configuration requires lots of space between the eye piece and the display module. Furthermore, complex lenses are needed if the HMD needs to display images with high quality and wide field of view. These lenses often make the device very bulky to wear.

A number of methods had been invented to eliminate the need of heavy lenses in HMDs. Light field displays use a high resolution image panel with a microlens array to integrate subsets of images onto different parts of the retina. This method leads to images with low effective resolution. Retinal scanning displays are capable of producing images with resolution equivalent to the native resolution of the laser scanner. However, the stringent requirement to align the scanning mirror through the eye's pupil means that it is very difficult to fabricate an HMD that fits different anthropometric variations.

Holographic HMDs typically suffer from several problems. Firstly, image quality is typically poor as spatial light modulators (SLMs) are only available for either phase or amplitude modulation but not both. Computational holograms often suffer from what is known as the zero order which consists of light appearing in unwanted regions on the retina. Secondly, speckle is usually visible in holographic displays which use laser sources. Thirdly, an ideal holographic image requires using an SLM with very high resolution or small pixel size comparable to optical wavelengths. This also means holographic images would typically require very high computational load. Finally, image size or field of view (FoV) of a holographic display is typically inversely proportional to the pixel size of the SLM. Although pixel sizes of available of SLM technologies are getting smaller over years, they are still too large in the foreseeable future to produce large holographic virtual images.

US20090002787 (Adrian et al., published Jan. 1, 2009) references the use of an optical system to increase the size of the projected holographic image by diverging the light forming the displayed image. However, the use of lenses after the spatial light modulator would need to be large. This may increase the weight of the HMD to a similar weight as the conventional eye piece based HMD system.

U.S. Pat. No. 5,854,697A (Caulfield et al., issued Dec. 29, 1998) describes a waveguide hologram illuminator which includes a thin substrate and planar surfaces for transmitting light. The hologram is mounted on one planar surface to produce a holographic image with uniform spatial intensity characteristics over the region which spatial intensity modulation occurs. However, the patent does not solve the problems of small image size in holographic displays.

WO2014064228A1 (Tremblay et al., published Oct. 2, 2014) describes an illumination device which includes a substantially planar light guiding element used for illuminating spatial light modulators. One of the inventions uses several illumination sources to produce backlights of different angular spectrums. WO2012062681A1 (Fuetterer, published May 18, 2012) describes the use of an SLM to temporally multiplex segments of holographic images in different parts of space in order to create a larger image. This method requires stitching up of several discrete images and may lead to discontinuity in the overall image.

WO2014209244A1 (Urey, Published Dec. 31, 2014) describes a device that uses a pinhole imaging principle to achieve wide field of view. However, the described HMD device uses a matrix of micro reflectors attached to the back surface of an SLM which are subjected to a size limit of fabrication and alignment challenges. Pixelation from the mirror matrix is also likely to cause poor optical quality in the HMD, which adds up with pixel size limitations of the SLM itself.

WO2014151877A1 (Cizmar et al., published Sep. 25, 2014) describes a head mount display which uses an illumination beam that is not perfectly collimated to remove zero-order light by allowing the zero order to be defocused, spreading power across the retina. However, such methods would reduce the image contrast of the holograms.

SUMMARY OF INVENTION

This invention concerns a design of a wearable display which enables the device to have reduced weight relative to known configurations without compromising other technical performances. The design is particularly suitable for a head mounted display or smart glasses with applications in virtual reality (VR) and augmented reality (AR).

The principle of the design involves the use of an optical element to create either a converging scanning beam axis or a converging wave front directed towards or close to the user's eye. A spatial light modulator (SLM) is optically located between the incoming illumination beam and the eye. The spatial light modulator adds a phase and/or amplitude term to the incident wave front and generates a holographic image. A possible pattern of this hologram could include the superposition of many mini-Fresnel lenses, where a point holographic virtual image is created when the beam illuminates a local region of the SLM containing such pattern. However, the SLM could also display various other patterns in the known art of computer generated holograms. By having a hologram encoded to a localized region in the SLM, the point image would have a limited viewing zone located around the user's eyes.

Because the illumination beam is already converging towards or close to the eye before reaching the SLM, the SLM will not need to have pixels too small to be fabricated to refract/diffract light at large angles. Hence, the angular size of the holographic image would not be limited by the finite pixel size of the SLM.

Point images in the hologram are encoded onto localized regions of the SLM in such a way that the viewing zone of different point images coincides. Because the beam is converging at a large angle, the holographic image can appear to have a large angular size to the user.

The hardware of the invention is a display system which includes a high spatial coherence light source, a beam expanding/diverging element, a beam converging element, and a spatial light modulator.

In a preferred embodiment, the light source is scanning laser beam. The source light is expanded by using a diffractive or refractive element. This is followed by a beam converging element, which may be a curved mirror. The curved mirror causes the emerging laser beam axis to converge towards the eye. A SLM is in the optical path following the curved mirror. After the SLM, the beam axis of the scanning beam remains approximately converging towards the eye. However, the beam wave front is now collimated/diverging at a small angle such that the eye can accommodate the beam.

Although the beam converging element is described as a generally curved mirror, to make the optics more compacted, the element may also be a segmented free form mirror, a Fresnel free form mirror, an optical wave guide, or a surface/volume with recorded phase/amplitude holographic features.

Subsequent embodiments describe alternative schemes, such as the use of stationary light sources or curved SLMs, to produce the holographic illumination beam and methods of presenting the holographic image to the user.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIGS. 2(a) and 2(b): First embodiment, showing the laser beam emerging from a Micro-Electro-Mechanical Systems (MEMS), including:
FIG. 2(a): Scanning laser beam at one instant in time.
FIG. 2(b): Scanning laser beam at two different instances in time.

FIG. 3: First embodiment, showing the field of view and size of the viewing zone of the holographic image.

FIGS. 4(a)-4(e): First embodiment, showing possible shapes of realizing/designing the light converging element, including:

FIG. 4(a): An ellipsoid shaped mirror.
FIG. 4(b): A reflective mirror converted into a Fresnel structure. The free form surface may have curvatures close to an ellipsoid.
FIG. 4(c): The optical element has a partially reflective surface embossed into a substrate with matching refractive index on both sides.
FIG. 4(d): The optical element could be shaped to create convergent rays such that instead of converging all rays towards a single point, rays corresponding to wide viewing angles converging further back towards the rotation pivot of the eye compared to paraxial rays.
FIG. 4(e): Rays corresponding to wide viewing angles in the direction of gaze remain unobstructed by the iris of the eye.
FIG. 6: Third embodiment, wherein a curved SLM unit is used to generate the hologram.
FIG. 7(a) and FIG. 7(b): Forth embodiment, wherein the beam converging element creates an astigmatic converging wave front.
FIG. 8: Fifth embodiment, wherein a high spatial coherence LED is used instead of the laser.
FIG. 11: Eighth embodiment, wherein the SLM is not located physically in front of the eyes but instead is reflected by optical elements such that the hologram appears in front of the eye.
FIG. 13: Tenth embodiment, wherein the y position of the laser scanner resets multiple times per image frame.

DESCRIPTION OF REFERENCE NUMERALS

Figure 1:
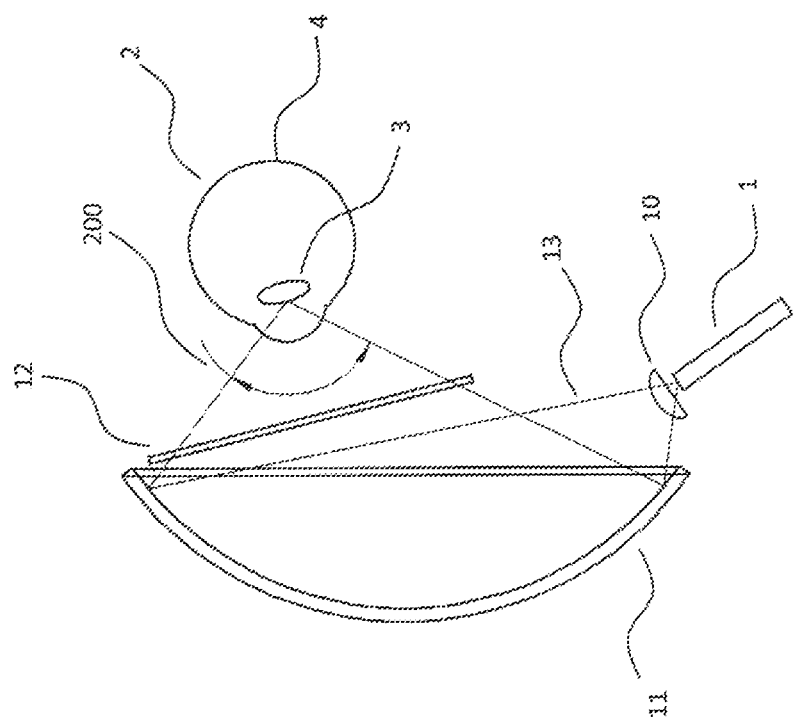
FIG. 1: First embodiment of this invention, showing the principal optical elements

1: Laser Source
2: Eye
3: Pupil of the eye
4: Retina of the eye
10: Beam expanding/diverging element
11: Beam converging element
12: Spatial Light Modulator (SLM)
13: Beam axis of instantaneous laser beam
14: Expanded/Diverging laser beam wave front
15: Scanning laser beam with beam axis converging towards/near the eye's pupil
16: Diverging wave front of a point image emerging from the SLM
17: Phase and/or amplitude pattern added to the light by the spatial light modulator according to the first embodiment
18: Virtual image of a point created by hologram
19: Overlapping area of scanning laser beam.
20: Static (non-scanning) laser source according to the second embodiment
21: Beam diverging element according to the second embodiment
22: Diverging wave front
23: Wave front converging towards the eye
30: Curved SLM according to the second embodiment
40: Beam converging element which creates an astigmatic converging wave front according to the forth embodiment 50: Plurality of high spatial coherence LED light sources according to the fifth embodiment
60: Beam splitter cube according to the sixth embodiment
61: Reflective SLM according to the sixth embodiment
70: Light converging element according to the seventh embodiment
71: SLM according to the seventh embodiment
80: Light guide or reflector according to the eighth embodiment
90: Viewing zone steering element according to the ninth embodiment
91a-b: Viewing Zone/Eye point at different locations as switched by the viewing zone steering element.
100: Beam waist of laser
101: Scanning path of laser beam
102: Resetting of the laser scanner's y-axis (with laser switched off)
200: Convergence angle of laser beam according to the first embodiment
201: Field of view of the holographic image according to the first embodiment
202: Size of viewing zone according to the first embodiment
203: Contour of ellipsoid Fresnel lens according to the first embodiment
204: Partially reflective coating according to the first embodiment
205: Transparent substrate according to the first embodiment
206: Convergence point of light converging from small angle (paraxial) from the optical axis
207: Convergence point of light corresponding to wide viewing angle
208: Rays obstructed by the eye/iris of the eye

DETAILED DESCRIPTION OF INVENTION

An aspect of this invention is a head mounted display or similar display devices that are fixed to the head. In exemplary embodiments, the display device includes a high coherence light source, a beam diverging/expansion element, a light converging element, and a spatial light modulator (SLM).

1$^{st}$ Embodiment

The first embodiment of this invention is shown in FIGS. 1-4. A head mounted display device includes a light source that emits a high coherence light beam, a beam expansion/diverging element that expands the light beam emitted by the light source, and a beam converging element that converges the expanded light beam into a viewing zone. Light emitted by the converging element is incident onto a spatial light modulator (SLM), and the SLM is configured to add a phase pattern and/or an amplitude pattern to the light beam to generate a holographic virtual image that is visible to a user wearing the head mounted display device. As used herein, the term "high coherence" is defined to mean that the emerging beam, after being magnified by various optics in the head mounted display, has a coherence area larger than the eye's pupil of a typical user.

FIG. 1 shows the components in a preferred embodiment. A laser light source configured as a scanning projector 1 is used as the light source. Modulated laser beams emitted from the projector is rasterized angularly by a rapidly switching mirror. Such a projector could be based on a rapidly switching two axis micro-electromechanical system (MEMS) mirror rasterizing laser beams two dimensionally. However, other known mechanisms for scanning a laser beam, such as the use of two single axis scanning mirrors or acousto-optic scanners, can also be used in place of the MEMS mirror.

The laser beam passes through a beam expansion/diverging element 10, which expands the beam to a diameter larger than the MEMS mirror. The expanded/divergent beam waist size is such that, after passing through all subsequent optics in the HMD system and the pupil 3 of the eye 2, the optics would allow a small spot on the retina 4. The described component 10 in a preferred embodiment is a simple beam expander, but could also include diffraction optics, mirror optics, or refraction optics used for expanding or diverging the beam. In addition, the component 10 could also have multiple optical elements if the expanded light source requires a decent beam quality.

The expanded laser beam is incident onto a beam converging element 11. The converging element 11 causes the beam axis 13 of the scanning laser beam at different times to converge in space towards the eye. The large convergence angle 200 of the laser beam would allow an image with a large field of view (FoV) to be seen without the need for the SLM to deflect light by large angles.

The beam emerging from the converging element 11 follows an optical path and is incident onto a spatial light modulator (SLM) 12 before entering the pupil 3 of the eye. The SLM displays a phase pattern, which could be a kernel (convolution matrix) convoluted with the image or a general hologram pattern, resulting in an image that the eye can accommodate. However, instead of or apart from displaying a phase pattern, the SLM may also introduce amplitude modulation to the laser beam.

The SLM 12 in a preferred embodiment is a transparent high resolution LCD panel capable of providing phase modulation in the polarization of the laser beam. However, depending on the exact polarization state of the light source, and whether the SLM is capable of phase and/or amplitude modulation, the LCD panel may also include polarizers in front and/or after the pixel matrix as in the case of known liquid crystal display configurations. When compared to competing SLM technologies such as reflective SLMs, LCDs may allow a more light weight HMD design by the elimination of certain optical elements such as beam splitter cubes. However, other known SLM technologies, such as liquid crystal on silicon (LCoS) and MEMS mirror arrays could also be used in place of the LCD panel to achieve the other advantages described in this invention.

If a transmission SLM is placed in front of the eye, it is still possible for the user to see the real world directly. This can be achieved by sequentially switching the hologram on and off, along with making the converging element 11 partially transparent, with additional known active optics to sequentially black out the real world.

Figure 2A:
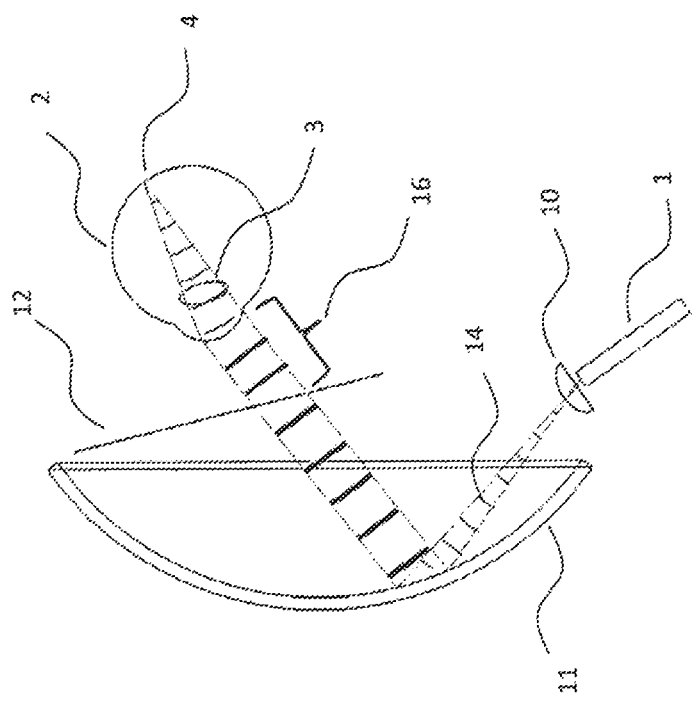

The laser beam wave front of an instantaneous scanning laser beam 13 is shown in FIG. 2(a) (elements 14-16), whereas FIG. 2(b) shows the wave fronts of the scanning laser beam at two instances in time. Generally, the beam expansion element is configured to generate an expanded beam wave front of the light beam generated by the light source, and the beam converging element is configured to converge the beam axis of the scanning beam 15. The SLM is configured to generate a holographic virtual image, wherein at the user's eye a spatial extent of the overlapping/intersecting area of the scanning beam waist 19 defines the viewing zone of the virtual image. Referring to FIG. 2(a), the expanded/diverging laser beam wave front 14 is expanded and could be (but not necessarily) diverging due to the element 10. The SLM 12 displays a phase hologram and produces a weakly divergent/collimated beam wave front 16 such that the eye is capable to accommodate for the holographic image. The divergence of this beam 16 is such that the apparent distance of the virtual image created by the beam would measure between 20 cm to infinity from the eye. The eye focuses this beam onto the retina and interprets it as a point image.

Using a laser scanning projector to produce holograms offers several advantages over the use of a static light source:

Firstly, it is possible that the beam expanding/diverging element 10 is small and may have a stronger power than the beam converging element 11, so the converging scanning laser beam axis 15 could already have a weak divergence close to what the eye can accommodate. If this is the case, then the phase mask displayed by the SLM 12 will not be required to provide such large phase modulation as the SLM will not need to turn a convergent wave front into a divergent wave front. Since pixel size is one of the major limiting technologies of SLMs, the configuration could provide good image quality relative ones where the wave front incident onto the SLM is converging.

In addition to creating a point on the retina 4, the SLM 12 can produce a single phase profile such that the retina sees an extended image. In this case, the SLM's phase profile would be the superposition of the holograms of many point images.

Secondly, because the beam illuminates different areas of the SLM time sequentially, the number of phase masks superposed onto each other can be reduced. Several sets of superposed phase masks can be separated time sequentially by displaying multiple holograms per image frame. This could lead to simpler algorithms for hologram generation and better image quality. The SLM need only be updated once or not more than a small number of times per image frame.

For color images, three lasers can be scanned sequentially or in a multiplex manner, and the appropriate holographic phase image is displayed. The brightness of each part of the image then can be an amalgamation of either a variation in the brightness of the laser and/or the transmission of the hologram on the SLM.

The SLM can create a holographic view from the beam from a phase and/or an amplitude approach by adding a phase pattern and/or amplitude pattern to the light beam to generate the holographic image. The phase and/or amplitude hologram can be made with either an additional polarizer or having a polarized laser source. An amplitude hologram would require an additional polarizer.

Although the drawing has depicted the converging beam axis as being convergent directly through the eye's pupil, it is also possible to have a configuration where the un-diffracted beam is converging to a region close to the eye rather directly through the pupil. In this case, only light diffracted by the SLM will enter the eye. This could be useful for making the un-diffracted zero order beam invisible to the user. However, other known methods of eliminating or hiding the un-diffracted beam from the viewer can also be used.

FIG. 3 is a trimetric view of the first embodiment, showing more clearly the geometry of the setup. The FoV 201 of the system is defined by the convergence angle 200 of the laser beam axis in addition to the maximum phase/amplitude modulation amplitude/frequency of the SLM 12. The size of the viewing zone 202 (where the eye needs to be placed for a view of the full image) is defined by the overlapping area of the emerging/diffracted scanning laser beam as well as the size of the phase and/or amplitude mask pattern 17 added to the beam. Ideally, this area should be larger than the pupil of the eye and allows adequate room for the rotation of the eye.

The position of the virtual images displayed by the device can also be controlled by changing the modulation amplitude/spatial frequency of the phase pattern hologram 17 on the SLM. An exemplary phase pattern/kernel displayed by the SLM could take the form of a Fresnel lens. Although the phase pattern/kernel could be translation invariant throughout the plane of the SLM for faster computational time, a phase pattern that varies as a function of position on the SLM would offer more robust features. For example, a spatially varying phase pattern could correct for off-axis aberration (due to optical elements and non-ideal off-axis behavior of the SLM or to correct for the user's eye prescription) for virtual images produced at large scanning angles of the laser beam. Alternatively, having phase patterns with high spatial frequency modulation at the edge of the SLM could increase the field of view (FoV) of the image.

The beam converging element 11 in a preferred embodiment is configured as a curved mirror where one side is coated with a high reflectivity material. One possible shape of this mirror would be a section of an ellipsoid as shown in FIG. 4a. An ellipsoid includes two foci, allowing aberration free imaging from the source 1 to the pupil 3. The mirror could also be made into a Fresnel lens as shown in FIG. 4b where the contours 203 of the ellipsoid/free form curved surface are segmented and made into a thin compacted element. The element could also be embossed into a material as shown in FIG. 4c where both sides of a transparent substrate 205 have matching refractive indices, and the curved element surface is coated with a thin and partially reflecting coating 204. In this case, light transmitting (from the real world) through the element will not experience a refractive lens as the gap with the reflective material is thin, but light reflecting by the reflecting material 204 will see an element with optical power as light is reflected by a curved surface.

Generally, the beam converging element could be a general free form element of any shape optimized for focusing one point (the light source) to another (the eye). Due to the finite area of the pupil 3 and the segmentation of the mirror leading to offset in centers of curvature in each Fresnel zone, the optimal shape of the element 11 could be some free form shape perturbed from an ellipsoid. Such free form surface could be designed by numerical optimization in optical modelling software.

It is possible for the convergence point for beams/rays 207 at a higher or wider angle to converge at a different location than beams/rays 206 that are paraxial (at small angles) from the optical axis. As the eye moves in order to view wider angle areas at high resolution, the pupil 3 would shift with this eye motion.

Having rays 207 at wide angles converging further back closer to the pivot at which the eye rotates would allow the pupil to intercept this beam directed near the fovea. Other rays 208 directed far away from the fovea are generally less important would have less impact on the user's viewing experience if they are obstructed (dashed line) by the iris of the eye. This can be a point of calibration that can be incorporated into the creation of the holograms or by mechanical setting through the design of the mirror 11.

Although the beam converging element is drawn to include a single reflective surface, such element, without a loss of generality, can also be configured as a flat element utilizing a waveguide/light guide type backlight with the use of known extraction methods to produce a converging/ directional/collimated beam. The flat element can be illuminated with a fixed laser or LED light source or projection system for time sequential operation. The backlight and SLM panels can form the basis of a flat modular arrangement, in which each component consists of a layer of a stack. The advantage of this approach is that the display is then thin and lightweight and could be included into an eye unit no larger than a pair of spectacles.

Subsequent embodiments in this description will be made in reference to the first embodiment and only the differences between the subsequent embodiments and the first embodiments will be discussed.

2nd Embodiment

Figure 5:
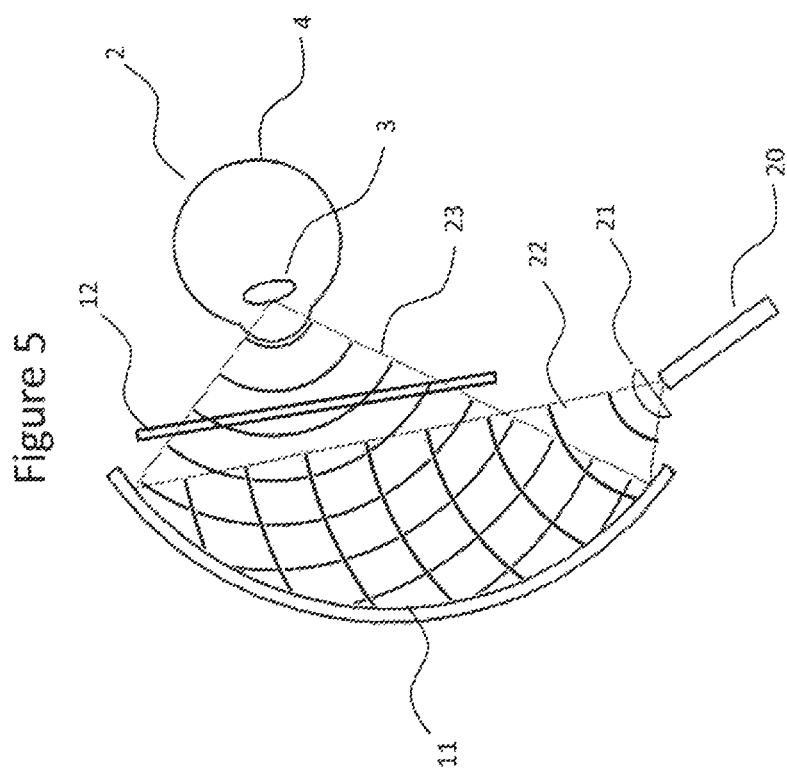
FIG. 5: Second embodiment, wherein a stationary laser source is used instead of a scanning laser.

The second embodiment is shown in FIG. 5, wherein a static non-scanning light source 20 is used in place of the scanning MEMS projector. The light source 20 could include a plurality of laser elements that respectively generate a plurality of laser beams, which may be in different colors such as red, green, and blue. However, other light sources with high spatial coherence sufficient to illuminating holograms may also be used, such as LEDs. The laser elements may be switched on and off time sequentially in synchronization with the SLM 12 in order to superpose holograms of different colors on top of each other. The light emitted from the light source 20 passes through a beam diverging element 21. The element 21 differs from the element 10 in the first embodiment as the element 21 serves to diverge the light emitted by the source at much larger angles rather than to just expand the beam. Such element can be made from a simple pin hole. However, the diverging element could also include other refractive/diffractive components such as a beam homogenizer or beam shaper optics to produce a more desirable/uniform amplitude distribution on the beam converging element 11.

The resultant diverging beam wave front 22 emerges at a large angle which fills up beam converging element 11. The beam 22 could either overfill or under-fill the beam converging element 11. A beam that overfills may provide a hologram image with better brightness uniformity across the whole image; whereas a beam that under-fills may allow a more energy efficient device. The wave front 23 emerging from the beam converging element 11 converges towards the eye 2. Unlike the first embodiment where the converging angle of the scanning beam axis determines the FoV, here the convergence angle of the wave front determines the FoV of the hologram.

The beam passes through a spatial light modulator 12 which displays a holographic phase mask, producing a wide FoV hologram. The phase mask required here differs from the first embodiment in the sense that it needs to construct a hologram from a large converging beam. The size of the viewing zone is approximately determined by the beam waist at the pupil of the eye. This configuration offers advantages as it has lower fabrication cost and fewer components compared to the first embodiment.

3rd Embodiment

FIG. 6 shows the third embodiment wherein a curved SLM 30 is used. The SLM surface could be normal to the converging beam axis or the converging beam wave front. Since SLM technologies (such as liquid crystal panels) often suffer from performance issues when light is incident at a large angle from its surface normal, this configuration would offer advantages in providing better optical quality compared to a flat SLM.

4th Embodiment

FIGS. 7a-b show the fourth embodiment wherein the beam converging element 40 has astigmatic properties. The beam axis emerging from this element converges towards two orthogonal astigmatic lines. Since the size of the overlapping beam waist determines the size of the HMD's viewing zone, such element would allow a larger viewing zone size along one axis and a wider FoV along the orthogonal axis. This configuration could be useful in optimizing for displays with different aspect ratios, and can also be useful for correcting prescription in the user's eye.

5th Embodiment

FIG. 8 shows the fifth embodiment wherein a plurality of LED light sources 50 with high spatial coherence is used in place of the laser. The light source could be a single LED, multiple LEDs at different positions, a matrix of addressable LEDs, or LEDs of different colors. Having LEDs in different distances from the optical axis would allow the hologram to have different viewing zones or the image to be in different positions in space; whereas having LEDs in different optical positions along the optical axis would allow the hologram to produce point images at an extended range of depths without the need to apply excessively large phase modulation in the SLM.

The use of LEDs could eliminate problems specific to lasers such as the presence of speckles. An ideal LED would have a narrow color spectrum since the hologram may introduce dispersion. However, if the phase pattern/kernels displayed on the SLM 12 are rotationally symmetrical about each holographic point image, narrow spectrum may not be critical as all point images produced by varying wavelengths would lie along the same line of sight.

6th Embodiment

Figure 9:
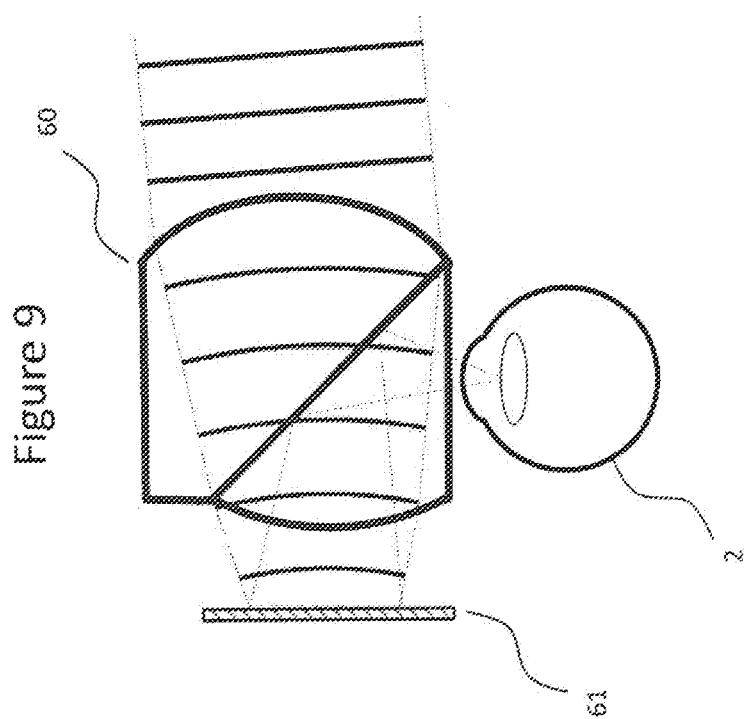
FIG. 9: Sixth embodiment, wherein a reflective type SLM is used to generate the hologram.

FIG. 9 shows the sixth embodiment wherein a reflective SLM 61 is used in place of a transmission SLM. Such SLM could be based on liquid crystal on silicon (LCoS) or MEMS technologies. The advantages of such system are smaller pixels and the double pass light paths. Smaller pixels would allow better image quality and larger image size; whereas double pass light path through the SLM would reduce the phase thickness required by the SLM, in some cases improving the switching speed. In this embodiment a beam splitter cube 60 may be used for directing light from the SLM into the viewing zone. The light converging element originally described in the first embodiment could be made in the form of a refractive lens, and may either be placed before the beam splitter or integrated as part of the beam splitter optics.

7th Embodiment

Figure 10:
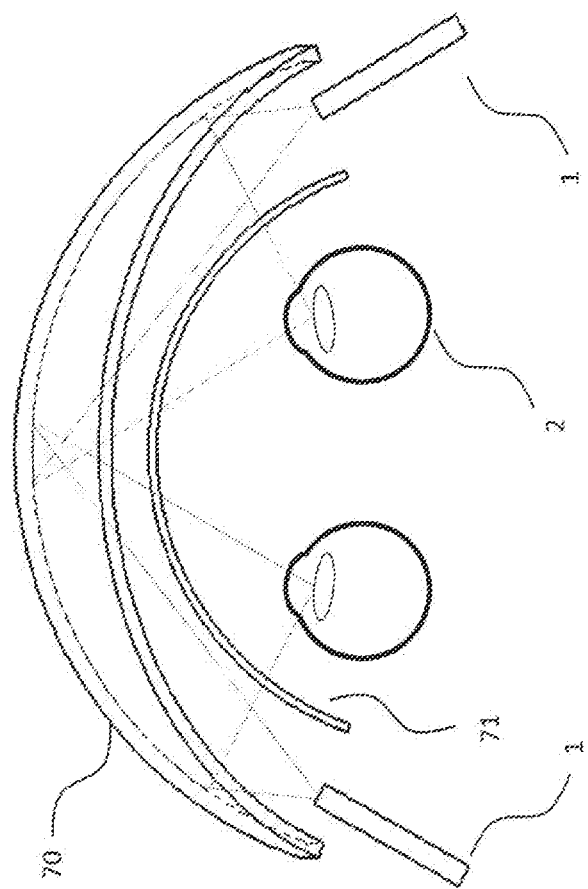
FIG. 10: Seventh embodiment, wherein the beam converging element covers both eyes.

FIG. 10 shows the seventh embodiment wherein a single beam light converging element 70 is used to cover both eyes. One or more SLMs 71 and one or more of light sources 1 are used. This configuration may allow a wider FoV as the same SLM and light converging element could be shared by both eyes. The SLM could produce holograms with different viewing zones by the use of multiple light sources illuminating overlapping regions of the SLM at different time sequences.

8th Embodiment

FIG. 11 shows the eighth embodiment wherein the SLM 12 is not physically located in front of the eye, but instead its image is reflected by known optical elements 80 such as mirrors or other reflectors and light guides that are configured to reflect the light from the SLM into the viewing zone, making the hologram appear to be in front of the eye. If the element 80 is partially transparent, then such device would allow the user to view the real world directly, allowing potential applications in augmented reality where the holographic image appears to be floating in the real world. The light source 1 can be scanning or non-scanning as described above.

9th Embodiment

Figure 12A:
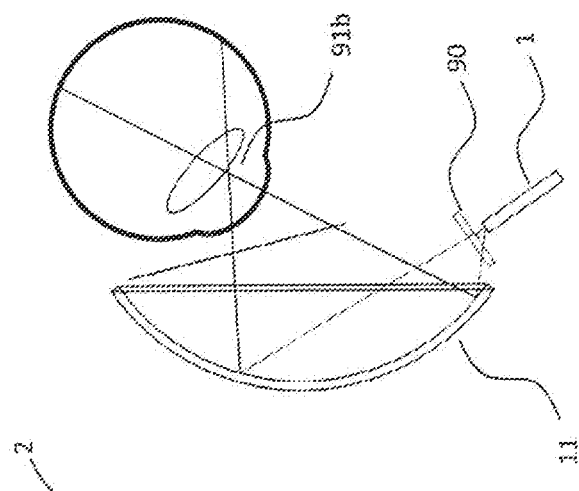
FIG. 12: Ninth embodiment, wherein an electrically switchable element is added to move the viewing zone of the hologram.
Figure 12B:
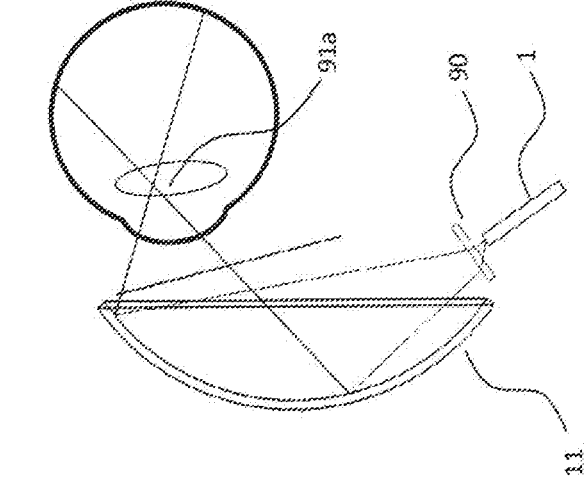

FIGS. 12a-b show the ninth embodiment wherein a viewing zone steering element 90 is placed along the optical path of the HMD close to the light source. This element could be an optical phase retarder, SLM, or other known technologies of displacing a light beam. This embodiment, if combined with a gaze tracker, could allow the viewing zone of the hologram to be moved according to the user's eye position (91a-b). This may further improve the peripheral vision and hence field of view.

10th Embodiment

FIG. 13 shows the tenth embodiment wherein the beam scanning path 101 of the laser beam produced by the scanning laser differs from conventional approaches used in laser scanning projectors. During one image frame, the y-axis beam resets several times as denoted 102 to a near-zero position. In each reset the y-axis is being offset by an amount defined by the beam waist 100. After each y-axis reset the laser produces a beam path that does not completely overlap with the previous path. Meanwhile, with each y reset, the SLM 12 could display a gradually shifting phase pattern or no shift at all. This could be useful since SLMs typically have a switching speed much slower than the laser scanner could oscillate. The beam path offset with each y-axis reset could be achieved with the MEMS device. However, the beam path offset may also be achieved using other additional component know to be capable of displacing a laser beam.

An aspect of the invention is a head mounted display device. In exemplary embodiments, the head mounted display device includes a light source that emits a high coherence light beam, a beam expansion/diverging element that expands the light beam emitted by the light source, a beam converging element that converges the expanded light beam into a viewing zone, and a spatial light modulator (SLM) onto which the light beam from the beam converging element is incident. The SLM is configured to add a phase pattern and/or an amplitude pattern to the light beam to generate a holographic virtual image that is visible to a user wearing the head mounted display device. The head mounted display device may include one or more of the following features, either individually or in combination.

In an exemplary embodiment of the head mounted display device, the light source comprises a scanning projector that emits modulated laser beams that are rasterized angularly by a scanning mirror.

In an exemplary embodiment of the head mounted display device, the scanning projector includes a two axis microelectromechanical system (MEMS) mirror.

In an exemplary embodiment of the head mounted display device, the light source comprises a static non-scanning light source including a plurality of laser elements that are switchable sequentially in synchronization with the SLM to superpose different holographic virtual images.

In an exemplary embodiment of the head mounted display device, the light source comprises one or more light emitting diodes (LEDs) that each respectively produces a holographic virtual image, wherein positions of the LEDs generates different viewing zones or positions of holographic virtual images.

In an exemplary embodiment of the head mounted display device, the light source comprises a scanning laser, and a scanning along a y-axis perpendicular to the light path is offset by an amount defined by a beam waist of the laser beam.

In an exemplary embodiment of the head mounted display device, the SLM is a transparent liquid crystal display panel.

In an exemplary embodiment of the head mounted display device, the beam expansion element is configured to generated an expanded beam wavefront of the light beam generated by the light source, the beam converging element is configured to converge the scanning beam axis and the SLM is configured to display a phase pattern and/or amplitude pattern t generate the holographic virtual image, wherein at the user's eye a spatial extent of a beam waist of the beam wavefront defines the viewing zone of the holographic virtual image.

In an exemplary embodiment of the head mounted display device, the beam converging element is a curved mirror with a reflective coating on one curved side.

In an exemplary embodiment of the head mounted display device, the beam converging element is configured as a Fresnel lens.

In an exemplary embodiment of the head mounted display device, the beam converging element comprises a transparent substrate and a curved element with a reflective coating.

In an exemplary embodiment of the head mounted display device, the SLM is curved.

In an exemplary embodiment of the head mounted display device, the beam converging element is astigmatic to converge the light beam towards two orthogonal astigmatic lines.

In an exemplary embodiment of the head mounted display device, the SLM is a reflective SLM.

In an exemplary embodiment of the head mounted display device, the device further includes a beam splitter for directing light from the SLM to the viewing zone.

In an exemplary embodiment of the head mounted display device, the beam converging element includes a refractive lens.

In an exemplary embodiment of the head mounted display device, the device includes a single beam converging element in combination with a plurality of SLMs and/or a plurality of light sources.

In an exemplary embodiment of the head mounted display device, the device further includes an optical element configured to reflect the beam from the SLM into the viewing zone.

In an exemplary embodiment of the head mounted display device, the optical element is partially transparent.

In an exemplary embodiment of the head mounted display device, the device further includes viewing zone steering element configured to move the viewing zone in accordance with an eye position of the user.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Industrial application will be mainly for wearable displays, in particular for achieving light weight Head Mounted Displays (HMD). The principal advantage of using a holographic type HMD is the manifestation of all 3D optical depth cues in the generated image content, and the possibility of allowing a light weight HMD device to be made without compromising on FoV and resolution. The system is light weight as no large eyepiece lenses are required. A large FoV hologram is achieved by using an optical element before a spatial light modulator to create either scanning beam axis or a wave front which converges towards the eye. Hardware manufactured using this invention may be useful in the fields of virtual reality (VR) and augmented reality (AR) for both consumer and professional markets. HMD manufactured by this invention could have applications including everyday use, gaming, entertainment, task support, medical, industrial design, navigation, transport, translation, education, and training.

What is claimed is:

1. A head mounted display device comprising:
a light source that emits a high coherence light beam;
a beam expansion/diverging element that expands the light beam emitted by the light source and preserves the coherence of the light beam;
a beam converging element that converges the expanded light beam into a viewing zone and preserves the coherence of the light beam; and
a spatial light modulator (SLM) onto which the light beam from the beam converging element is incident, and the SLM is configured to add a phase pattern and/or an amplitude pattern to the light beam to generate a holographic virtual image located other than at the SLM that is visible to a user wearing the head mounted display device.

2. The head mounted display device of claim 1, wherein the light source comprises a scanning projector that emits modulated laser beams that are rasterized angularly by a scanning mirror.

3. The head mounted display of claim 2, wherein the scanning projector includes a two axis micro-electromechanical system (MEMS) mirror.

4. The head mounted display device of claim 1, wherein the light source comprises a static non-scanning light source including a plurality of laser elements that are switchable sequentially in synchronization with the SLM to superpose different holographic virtual images.

5. The head mounted display device of claim 1, wherein the light source comprises one or more light emitting diodes (LEDs) that each respectively produces a holographic virtual image, wherein positions of the LEDs generates different viewing zones or positions of holographic virtual images.

6. The head mounted display device of claim 1, wherein the light source comprises a scanning laser, and a scanning along a y-axis perpendicular to the light path is offset by an amount defined by a beam waist of the laser beam.

7. The head mounted display device of claim 1, wherein the SLM is a transparent liquid crystal display panel.

8. The head mounted display device of claim 1, wherein the beam expansion element is configured to generated an expanded beam wavefront of the light beam generated by the light source, the beam converging element is configured to converge the scanning beam axis, and the SLM is configured to display a phase pattern and/or amplitude pattern to generate the holographic virtual image, wherein at the user's eye a spatial extent of a beam waist of the beam wavefront defines the viewing zone of the holographic virtual image.

9. The head mounted display device of claim 1, wherein the beam converging element is a curved mirror with a reflective coating on one curved side.

10. The head mounted display device of claim 1, wherein the beam converging element is configured as a Fresnel lens.

11. The head mounted display device of claim 1, wherein the beam converging element comprises a transparent substrate and a curved element with a reflective coating.

12. The head mounted display device of claim 1, wherein the SLM is curved.

13. The head mounted display device of claim 1, wherein the beam converging element is astigmatic to converge the light beam towards two orthogonal astigmatic lines.

14. The head mounted display device of claim 1, wherein the SLM is a reflective SLM.

15. The head mounted display of claim 14, further comprising a beam splitter for directing light from the SLM to the viewing zone.

16. The head mounted display of claim 14, wherein the beam converging element includes a refractive lens.

17. The head mounted display device of claim 1, including a single beam converging element in combination with a plurality of SLMs and/or a plurality of light sources.

18. The head mounted display device of claim 1, further comprising an optical element configured to reflect the beam from the SLM into the viewing zone.

19. The head mounted display device of claim 18, wherein the optical element is partially transparent.

20. The head mounted display device of claim 1, further comprising a viewing zone steering element configured to move the viewing zone in accordance with an eye position of the user.

* * * * *